Figure 1:
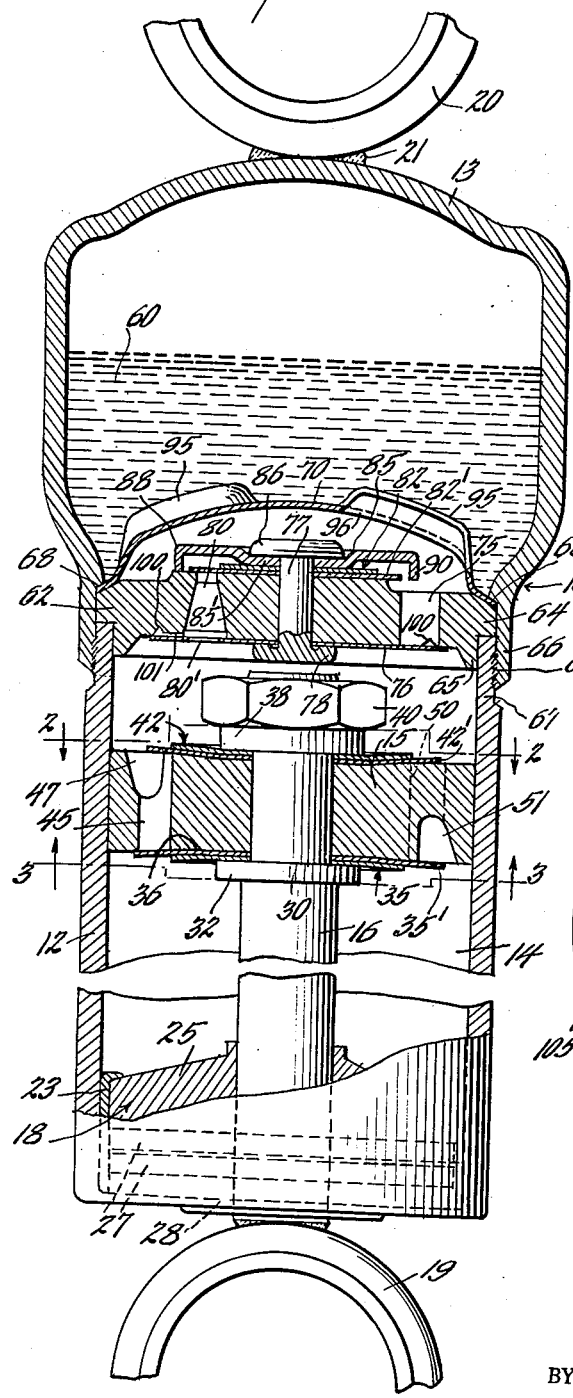

Feb. 26, 1963

C. M. L. L. BOURCIER DE CARBON ETAL 3,078,965

SHOCK ABSORBERS

Filed Nov. 8, 1960

3 Sheets-Sheet 1

INVENTORS
C. M. L. L. Bourcier de Carbon
John E. Heckethorn
BY Watson, Cole, Grindle & Watson
ATTORNEYS

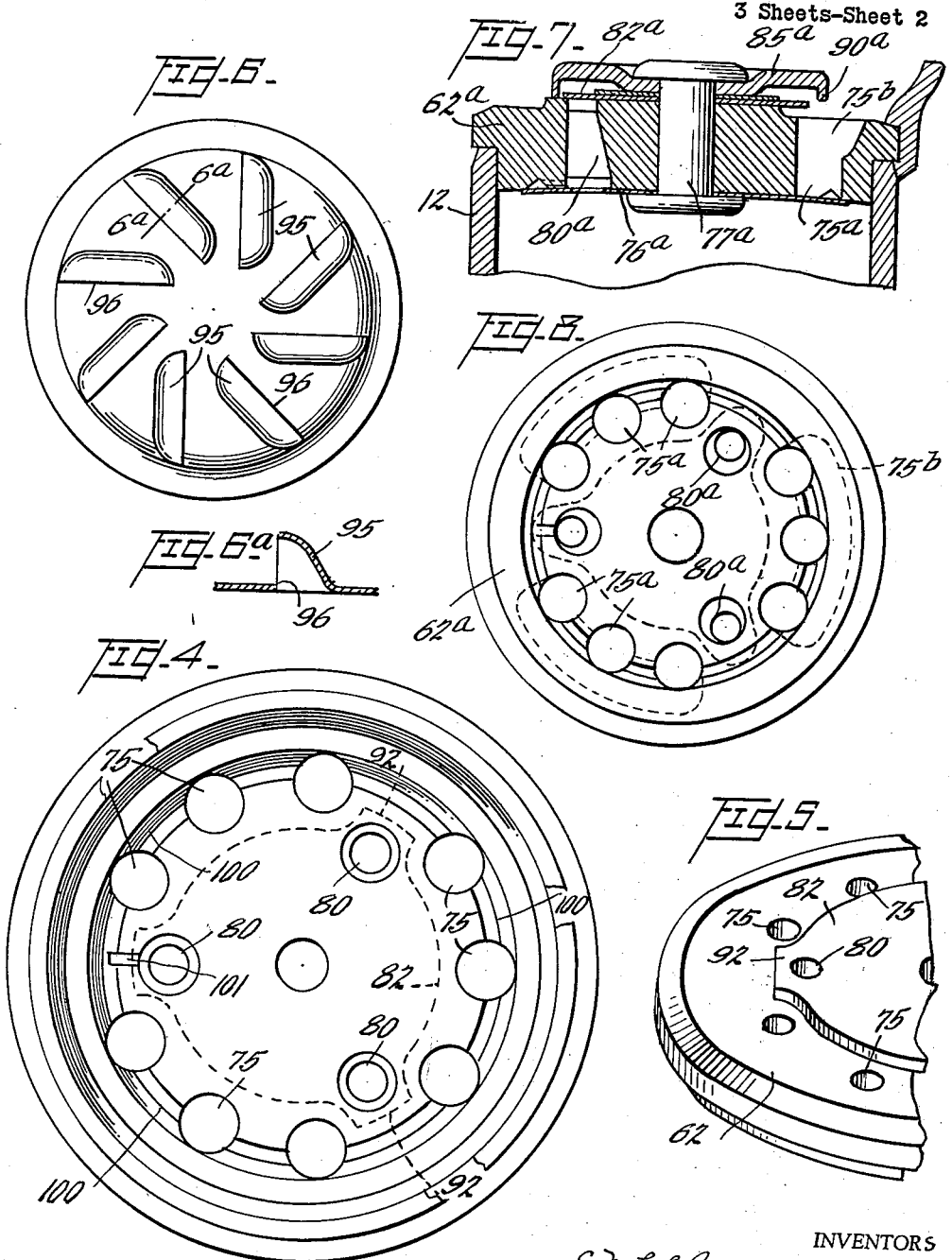

COMPRESSION
REBOUND

COMPRESSION
REBOUND

COMPRESSION
REBOUND

COMPRESSION
REBOUND

25"/sec.
20"/sec.
15"/sec.
10"/sec.
5"/sec.

United States Patent Office 3,078,965
Patented Feb. 26, 1963

3,078,965
SHOCK ABSORBERS
Christian Marie Lucien Louis Bourcier de Carbon, Neuilly-sur-Seine, France, and John E. Heckethorn, Dyersburg, Tenn.; said Heckethorn assignor, by mesne assignments, to said Bourcier de Carbon
Filed Nov. 8, 1960, Ser. No. 68,003
Claims priority, application France Nov. 18, 1959
11 Claims. (Cl. 188—88)

This invention relates to shock absorbers and more particularly to hydraulic double-acting shock absorbers of the piston-and-cylinder type particularly adapted for damping the relative movements of automobile bodies or chassis and wheel suspensions.

The general object of the invention is to provide a novel and improved shock absorber of the class described, which embodies a combination of cooperating and advantageous features affording better control of the damping functions when applied to an automobile spring suspension, and therefore providing better riding qualities for the vehicle without sacrificing economy of manufacture or simplicity of construction and installation.

Expressed more specifically, the invention contemplates the coordination of the piston valving and the reservoir or rod displacement valving, sometimes called anti-cavitation valving, to provide damping by orifice metering during only low velocity piston movements, by both orifice and valving control during medium velocity piston movements, and almost entirely by valving control during high velocity movements. Added to this improved coordination is the important fact that the valving for both the piston and the reservoir inlet passageways is of the progressive type whether for compression or rebound resistance. There is no pre-loaded blow-off valving in the novel shock absorber.

Thus, there is provided a progressive velocity sensitive piston; the faster it moves the greater the holding power. Coupled with this is a rod displacement control or anti-cavitation system embodying progressive velocity sensitive disc valving, proportioned to work in unison with inward or compression movement of the piston rod, whereby the resistance of the damping liquid to the entrance of the piston rod increases progressively with the velocity.

Further, the progressive valving is attained in all cases by the use of disc assemblies of considerable flexibility and which are so mounted as to bend or flex in purely cylindrical distortion over the orifices of the fluid passageways, which not only radically reduces wear and deterioration, but prevents unpredictable buckling or popping-off which might occur if the discs were subject to the instabilities of conical distortion or flexure.

The nicely calibrated damping system including the reservoir or rod-displacement valving, for maximum efficiency, requires a relatively clear unaerated damping liquid. Compensation for piston rod displacement requires an equivalent volume of oil or other damping fluid to flow between the working chamber and the upwardly disposed reservoir at every stroke. If the oil becomes aerated, a compressible mixture is carried into the working chamber on the rebound stroke, and this results in a momentary loss of control on the succeeding compression stroke. This phenomenon has become known as "compression lag" and can be detected not only by instrumentation but can also be felt in the riding qualities of the suspension, this rough transition causing a noticeable jerk. Therefore, novel provisions are made for the substantially complete elimination of reservoir turbulence which would give rise to foaming. These provisions include a baffle arrangement which so dissipates the jetting of liquid through the rod-displacement or reservoir inlet valving that only minor ripples appear on the surface of the fluid in the reservoir.

Other objects and features of novelty, including disc valve details, cooperation of the baffles with the disc valves, installation of the reservoir or rod-displacement valve partition, and the provision of easily calibrated passageways in both the piston and partition portions for orifice control at low velocities, will be apparent from the following specification when read in connection with the accompanying drawings in which certain embodiments of the invention are illustrated by way of example.

Figure 2:
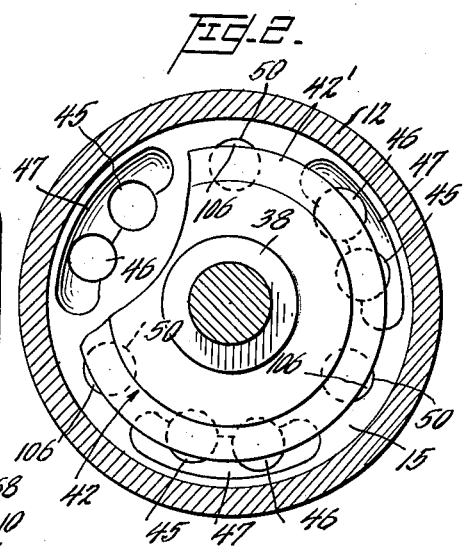
Figure 3:
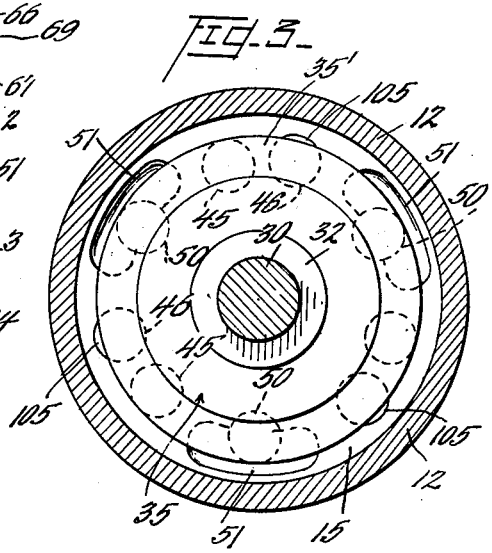

In the drawings:
FIGURE 1 is a view in vertical longitudinal section of a shock absorber embodying the principles of the invention;
FIGURE 2 is a transverse sectional view taken on line 2—2 if FIGURE 1 and showing the piston in top plan aspect;
FIGURE 3 is a similar view showing the underside of the piston and taken on line 3—3 of FIGURE 1;
FIGURE 4 is a bottom plan view of the rod-displacement valve partition plate member;
FIGURE 5 is a fragmentary view in perspective of an edge portion of the top surface of the rod-displacement valve partition;
FIGURE 6 is a top plan view of a baffle element employed in the rod-displacement valve system;
FIGURE 6a is a fragmentary sectional view taken on line 6a—6a of FIGURE 6;
FIGURE 7 is a vertical transverse sectional view of a modified form of rod-displacement valve plate;
FIGURE 8 is a bottom plan view of the plate member shown in FIGURE 7; and
FIGURES 9–12 inclusive are diagrams of resistance curves taken under various arrangements of valving and demonstrating the cooperation of the piston and rod-displacement valving assemblies.

The shock absorber in FIGURE 1 of the drawings is designated generally by the reference numeral 10 and comprises a cylindrical portion 12 and a widened upper dome portion 13. The cylindrical portion 12 encloses the working chamber 14 in which the piston 15 is adapted to reciprocate. The piston has a rod 16 which extends through a packing arrangement designated generally by the numeral 18 and terminates in an attachment ring or eye 19 which is adapted to be secured to the wheel mounting of the vehicle.

A similar attaching ring or eye 20 is welded as at 21 to the top of the dome 13 and is adapted to be connected to a portion of the vehicle body or chassis.

For the purposes of illustrating the present invention, any fluid-tight seal may be employed for the piston rod and the arrangement designated 18 can be of the type featured in other applications and patents by the present inventors. For example, the arrangement 18 may be in the form of a cartridge having a casing 23, a top plate 25, a pair of radially stressed composition washers 27, and a wiper washer shown diagrammatically at 28.

The piston 15 has an attenuated upper portion 30, and seated upon the shoulder between the main diameter of the piston 16 and the attenuated portion is a clamping plate 32 for the compression valving discs indicated generally at 35. It is preferred that four of these extremely thin discs be employed, in graduated diameters, the largest disc 35' lying against the lower slightly concave face 36 of the piston 15. However, for the purposes of clearness of illustration, only two valve discs are shown in the drawings.

The attenuated end 30 of the piston rod passes through the central opening in the piston and the upper end is surmounted by the upper disc clamping ring or plate 38 and the hexagonal nut 40 which secures all of the piston parts in place. Beneath the plate 38 are disposed the rebound piston valving indicated by the general reference numeral 42 and preferably comprising four graduated discs as in the case of the compression valving, the larger and lowermost disc 42' lying against the slightly concaved top surface of the piston.

FIGURES 1, 2 and 3 illustrate quite clearly the orifice arrangement for the piston. The compression control passageways open through paired orifices in the lower surface of the piston, but the entrance to the passageways on the upper side of the piston comprise an arcuate somewhat oval-shaped common orifice for the two passageways. Reference to FIGURE 2 of the drawings will show one set of these compression passageways viewed from the top, that is, through the common oval entrance cavity. The passageways themselves as they open through the bottom of the piston and as they are controlled by the lower set of discs, are clearly shown in FIGURE 3, where it will be seen that the passageways are staggered a slight degree so that one of them projects slightly beyond the periphery of the controlling valve disc.

The radially inner passageway is designated 45, the radially outer one is indicated at 46, and the arcuate oval entrance cavity is shown at 47. The larger valve disc which controls the orifices is indicated also in FIGURE 3 at 35'.

It will be noted that the compression passageways and orifices are arranged in three pairs spaced 120° apart, so that the valve discs will be subjected to cylindrical flexure by the passage of fluid under pressure through the passageways, according to the novel principle set forth in the copending application of Bourcier de Carbon Serial No. 701,585, filed December 9, 1957, now Patent No. 3,003,594.

The reason for extending one of the orifices slightly beyond the periphery of the controlling valve disc will be developed presently.

The rebound valving installation at the upper side of the piston will now be described. The rebound passageways are three in number and are given the designation 50. They are spaced 120° apart in order to attain cylindrical flexing as previously described, and the passageways 50 are intersected by an arcuate conical entrance cavity 51 in the bottom face of the piston as clearly shown in FIGURE 3 of the drawings.

The widened arcuate entrance cavities are provided in both the compression and rebound systems to insure that the valving at the entrance side of the piston in each case will not control the passage of fluid at the entrance point. The cavities are made sufficiently large to accommodate the greatest volume of fluid that would flow through the given passageways for control at the outlet orifice end.

Within the dome 13 of the shock absorber casing is located the reservoir or expansion chamber 60 which is provided to accommodate the displacement of working fluid from the working chamber 14 by the progressive entrance of the piston rod 16 into the chamber through the packing cartridge 18. The working chamber 14 is separated from the reservoir 60 by the partition member 62, this member being formed with a radially outwardly extending peripheral flange 64 from which extends an annular depending flange 65. The shoulder between the flanges 64 and 65 rests upon the upper peripheral end of the cylinder wall 12, and a depending flange 66 extending from the wall of the dome 13 envelops the flange 64 of the partition 62 and the slightly narrowed upper end portion 67 of the cylinder wall 12. The shoulder 68 serves to clamp the partition 62 in place against the end of the cylinder and the dome is finally welded as at 69 to the cylinder wall portion 67 by resistance welding.

The margins of a cap-like baffle plate 70 are clamped between the upper surface of the marginal flange 64 of the partition plate and the shoulder 68 of the dome 13. The details of this baffle plate will be described presently.

The partition 62 disposed between the working chamber 14 and the reservoir chamber 60 is best disclosed in FIGURES 1, 4 and 5 of the drawings. For very quick return of the damping liquid from the reservoir to the working chamber, the plate or partition 62 is provided with nine passageways 75 arranged in groups of three, the groups themselves being spaced apart at angles of 120° to maintain the principle of cylindrical deflection of the valve discs. These passageways 75 in this embodiment are cylindrical and the orifices thereof which open out on the underside of the partition 62 are covered and controlled by a single flexible valve disc 76, which is held against the bottom surface of the partition 62 by means of the rivet element 77 which extends axially through the plate. The head 78 of the rivet 77 causes the central portion of the disc valve 76 to bear snugly against the bottom surface of the plate 62, which may be slightly concaved, if desired, to insure the snug positioning of the valve disc.

Alternating with the three groups of outlet or rebound passageways 75 are the compression passageways 80 of which there are three, spaced 120° apart and opening upwardly through the raised or bossed area 82 of the top surface of the plate 62. The passageways 80 are preferably frusto-conical in configuration and may have cylindrical orifices at their upper and lower ends.

For controlling the outlet orifices of the passageways 80 there is employed the valve installation 82 which may comprise the two discs shown in FIGURE 1, the lower larger disc which extends over the orifice of the passageway 80 being designated 82'.

The discs 82 are clamped centrally against the upper surface of the plate 62 by means of the primary baffle member 85, the central portion 85' of which is depressed and adapted to bear upon the discs, the entire valve assembly including the baffle 85 being firmly held together by the rivet member 77 which has a circular head 86 bearing upon the depressed central upper surface portion of the baffle. The effective diameter of the lower depressed central portion 85' of the baffle 85 is accurately controlled to provide very precise tension on the valve discs and enabling them to perform the cylindrical flexing which is a feature of the invention. The outward portions 88 of the baffle 85 are spaced above the valve disc assembly 82 and the lower downwardly turned annular flange 90 is adapted to rest firmly upon the three spaced projecting promontories 92 of the raised upper surface or embossment 82 of the plate 62, the flange 90 being disposed just outwardly of the margins of the lowermost valve disc 82'.

The secondary baffle 70 which surmounts the rod displacement valve partition assembly has already been mentioned as having its margins clamped beneath the shoulder 68 of the dome element. The major portion of the baffle 70 is bowed upwardly in a sort of hat-shaped configuration and is provided with an annular series of hoods 95 formed by slitting the baffle plates 70 along radial lines 96 and then bulging the hooded formation 95 outwardly in a position such as indicated in FIGURE 6a whereby the fluid, already diverted by the primary baffle, is guided into a whirlpool movement which effectively prevents foam producing turbulence.

Upon the underside of the partition plate 62 there is formed an inverted V-shaped annular groove 100 which intersects the lower orifices of the passageways 75. At one point around the periphery of this groove and in transverse alignment with one of the compression passageways 80 is a connecting groove 101 which is quite shallow and of a calibrated depth determined by the amount of by-passage of liquid desired. It will be readily seen that the groove 101 permits passage of fluid from one of the compression passageways 80 to the return or rebound passageways 75. This affords means for permitting by-passing of fluid around the valves during very slow velocity movements of the piston, and this arrangement cooperates with the provision of the by-passage of fluid around the piston 15 through the crescent-shaped permanently open orifice portions 105 and 106 provided by the outward extension of the passageways 46 and 50 of the piston beyond the periphery of their controlling valve discs. This latter feature is clearly shown in FIGURES 2 and 3 of the drawings.

By the means just described, provision is made for the by-passage of small quantities of fluid through both the piston and the rod-displacement valve partition during low velocity movements of the piston as would be encountered on boulevard riding. It is apparent that on slightly rougher roads the piston velocities will be somewhat greater and the various valves of the piston and reservoir installations will be opened progressively to the extent required and add to the damping resistance to the passage of fluid so that the control at these intermediate velocities would be partly by the by-pass orifices and partly by the initial flexing of the progressive spring discs. Upon encountering rougher terrain or striking sudden declivities or dumps, the piston velocity would of course increase, sometimes rather sharply, and these extremes of control would be practically completely by way of progressive flexure of the valve discs as afforded by the provisions for cylindrical flexing. There is shown diagrammatically in FIGURES 9–13 of the drawings, certain resistance curves which resulted from testing the shock absorber in fully equipped condition and also with certain of the valves removed. During these tests, any friction factor was greatly reduced by the use of a low-friction Teflon piston rod seal.

In these curves the abscissa represent piston displacement and the ordinates above and below the horizontal axis represent respectively, resistance on compression and on return movement of the piston. It is to be noted that, since the shock absorber which is the subject of the present invention probably finds its most widespread use in connection with the spring suspensions of automotive vehicles, the contracting movement of the shock absorber may be aptly designated the compression movement and the separating movement of the piston and cylinder may be designated as the rebound movement.

Figure 9:
Figure 10:
Figure 11:

In producing the curves, the tests were run at various piston velocities, namely, five inches per second, 10 inches per second, fifteen inches per second, and twenty inches per second, and twenty-five inches per second. These various curves are separately readable and are segregated one from the other in the example given in FIGURE 12 of the drawings where all of the valving in both the piston and the rod displacement partition are installed, and the curves may be conveniently designated by the proper inscriptions. However, in FIGURES 9, 10 and 11, showing readings where much of the valving has been removed, the curves overlap considerably and it is difficult to apply the velocity inscriptions. However, the uppermost curve in these cases from which a reading may be taken is understood to represent the pressure at the maximum velocity of twenty-five inches per second.

In the case of FIGURE 9, all piston and rod-displacement valves were removed and the curve is flat, there being no resistance to either compression or rebound. This curve of FIGURE 9 also represents substantially the condition in which the only valving employed was the return valve at the lower face of the partition. Under these conditions, the curve is still substantially flat.

The condition represented by the resistance curve of FIGURE 10 is where all valving was removed from the piston, but both inlet and return valving were applied to the rod-displacement partition. This curve indicates no rebound resistance and very slight compression resistance. The resistance of the excess displaced oil equals the maximum force of say approximately fifty pounds altogether, and all on the compression side.

The curve in FIGURE 11 represents the condition where the rod-displacement partition was supplied with all of its valve discs, but the piston only with its rebound valves. It will be seen that the curve is nearly as flat as that shown in FIGURE 10.

Figure 12:
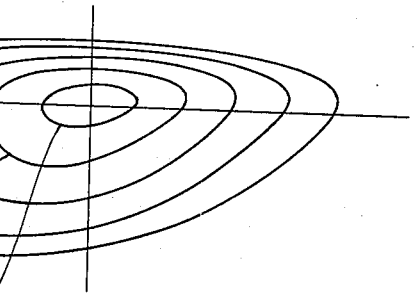

In FIGURE 12 a curve is shown which represents the resistance condition of the shock absorber for one particular automotive application with all valves in place, with very adequate progressive control on both compression and rebound strokes. The various indications of the curves in this particular example with regard to velocity, stroke, and pressures, may be considered to be approximately as follows:

5″/sec.—2 cm.—Compression 80 lbs.—Rebound 80 lbs.
10″/sec.—4 cm.—Compression 140 lbs.—Rebound 230 lbs.
15″/sec.—6 cm.—Compression 180 lbs.—Rebound 375 lbs.
20″/sec.—8 cm.—Compression 210 lbs.—Rebound 500 lbs.
25″/sec.—10 cm.—Compression 250 lbs.—Rebound 575 lbs.

These curves substantiate the unique feature of obtaining virtually all compression control from the piston action rather than from the rod displacement valving. Also, it is evident from the curves that the rod-displacement valving is progressive, thereby cooperating with the progressive action of the piston valving.

The action of the shock absorber under conditions of compression and rebound will now be described.

Upon compression movement of the piston 15 upwardly in the working chamber 14 the rebound valving 42 on the top of the piston will cover the rebound passageways 50 with the exception of the permanently open crescents 106 and will overlie a portion of the oval intake cavities 47 of the compression passageways 45 and 46, but will not obstruct the maximum required intake for these passageways at any time.

If the compression movement of the piston is quite slow, the permanently open crescent-shaped by-pass passages 106 and 105 will accommodate the flow of the damping fluid from one side of the piston to the other. It is generally preferable to have twice as much permanent passage area on the rebound face of the piston as on the compression face.

Now under these same conditions of slow piston velocity on compression movement of the piston, the progressive entrance of the piston rod 16 will displace working fluid into the reserve fluid chamber 60 first into the intake end of the compression passageway 80 through the openings 80′ in the disc 76, thence through the by-pass groove 101 and around the annular channel 100 into the return passageways 75, and thence upwardly into the reservoir 60. It will be readily understood that under these conditions of very slow piston movement the by-passing of the liquid through the small passageways will create no appreciable turbulence.

Now upon more rapid upward or compression movement of the piston 15, the by-passage of oil through the passageways 45 and 46 will flex the valves 35 downwardly and progressively in cylindrical fashion permitting a controlled flow of fluid from above the piston to the portion of the working chamber 14 below the piston. At the same time, a more rapid flow of fluid from the working chamber to the reservoir 60 takes place through the passages 80, thus flexing the valving 82 progressively upwardly and permitting the fluid to flow around beneath the primary baffle 85 and escape outwardly under the rim or flange 90 of this baffle. Thus the oil cannot escape in a straight jet but is diverted horizontally, escaping beneath the flange 90 and thence through the hooded openings in the secondary baffle 70, all without creating undesirable turbulence or jetting.

Of course, upon extremely rapid compression movement of the piston 15 the compression valving 35 of the piston and 82 of the rod-displacement control system are progressively flexed to a greater degree and the whirlpool effect of the secondary baffle 70 comes into greater prominence completely damping top surface turbulence. Even at very high velocities the surface remains quite calm, only minor ripples appearing to disturb the surface of the liquid.

Upon rebound movement of the piston downwardly within the chamber 14, fluid passes upwardly from beneath the piston into the cavities 51 of the rebound passageways 50, thence through these passageways and out through the crescent-shaped orifices 106 as well as through crescent-shaped openings 105, if the rebound movement is gentle or of a low velocity. At the same time, the oil returning from the reservoir 60 to replace the volume of the withdrawing piston rod, flows through fluid return passageways 75 and out around the periphery of return valve disc 76.

Upon high velocity movement of the piston in the rebound direction, the flow through the passages 45 and 46 is more rapid and will flex the valving 35 progressively according to the cylindrical pattern and permit more rapid fluid escape; the resistance, however, increasing progressively rather than abruptly. Similarly, the more rapid flow through the fluid return passageway 75 of the reservoir partition 62 will increase and the flexing of the return valve disc 76 will increase in the same manner.

It will be noted from FIGURE 1 that the openings 80' in the disc 76 accommodating flow into the compression passageways 80 is of a slightly smaller diameter than the intake orifice of the passageway itself. This provision is of importance in insuring that any slight burr which might be left on the margins of the opening 80' will not interfere with the proper seating of the valve against the bottom surface of the partition.

It will be noted that the primary baffle 85 offers substantially no resistance to the return flow through the passageway 75, but in the case of compression movement the flow through the passageways 80 must be diverted laterally of the promontory or projection 92 of the surface 82 of the partition to escape laterally beneath the edge 90 of the baffle.

In FIGURES 7 and 8 of the drawings there is shown a modified form of rod-displacement valve plate which may be useful in shock absorbers of smaller inside diameter. The only difference here is the provision of enlarged intake cavities for the several return passageways and offset compression inlet passageways, and an inward deflection of the intake orifice of the compression passageway. The cylinder walls are designated 12 as in the earlier described embodiment, the partition is indicated at 62a, and the inwardly angled compression passageways are at 80a. The return passageway 75a is provided with the outwardly enlarged intake cavity portion 75b which affords a larger volume of return flow under the outer flanged edge 90a of the primary baffle 85a. The return valve disc is indicated at 76a and the compression valving shown at 82a, a rivet 77a binding the parts together. The other parts are the same as corresponding parts of the previously described embodiment.

In summary, it may be stated that numerous advantages accrue from the described construction. In the rod-displacement valving installation the valve discs are much larger than in the usual shock absorber of this general type and they open progressively accurately metering the flow under all conditions of operation. The valve discs are of light weight, are self-cleaning, and react instantaneously to rod movement within a wide range of temperatures and velocities. In the case of the piston construction, the valves are also of extra large diameter, of silent operation, and are velocity sensitive. Their ability to open wide makes for the best low temperature performance and insures proper control at the higher piston velocities. The arrangement also affords an almost unlimited valving range with many possible combinations of diameter and thickness.

The present described shock absorber is truly double-acting in the strict sense of the word. Some so-called double-acting shock absorbers use piston rod displacement for compression control, the small diameter rod functioning as a piston in this connection. This practice of relying too much on such rod control can result in problems such as delayed action, fading, fluid fatigue, and temperature-versus-control variations. In this case, as suggested by the curves previously discussed, the piston itself provides virtually all compression and rebound control.

It is to be understood that the present invention may be embodied in shock absorbers for the widest scope of utility, but since it may find its greatest application to the wheel suspensions of motor vehicles, it has been found convenient in some parts of the specification to refer the description to that form of installation, and terminology pertinent to the motor vehicle field has been employed, but not in any limiting sense. Thus, the inward telescoping movement of the piston and piston rod with respect to the cylinder is sometimes referred to as the compression stroke, and the outward or return movement may be designated the rebound stroke.

Although for purposes of illustration the invention has been shown and described in connection with a shock absorber in which the cylinder is the upper telescoping member and the piston rod the lower one, it is understood that the novel features of invention are not all limited to application to such installations, but wherever feasible may be employed in assemblies which are the reverse of the illustrated embodiment. Thus the terms "upper," "lower," and other directional phraseology employed in certain of the claims are not used in any restrictive sense but only to facilitate the description as referrable to the illustrative figure of drawing.

It is to be noted that various changes and modifications may be made in the embodiments illustrated and described herein without departing from the scope of the invention as defined by the following claims.

Having thus described the invention, what is claimed as new and desired to be secured by Letters Patent is:

1. A hydraulic double-acting shock absorber comprising a cylinder enclosing a working chamber normally filled with damping liquid, a piston disposed for reciprocation within said working chamber, means for closing both ends of said cylinder, the means at one end of the cylinder comprising packing means, a piston rod connected to said piston and extending through said packing means; passageways extending through said piston for by-passing working liquid from one side of the piston to the other upon movement of the piston in either direction, and resiliently yieldable valves controlling the flow of liquid through said piston passageways; means comprised in the shock absorber serving as a damping liquid reservoir, a partition separating said working chamber from said reservoir, passageways extending through said partition for the respective passage of damping liquid from the working chamber into said reservoir upon displacement by increased penetration of the chamber by said piston rod upon the inward stroke of the piston, and return of liquid from the reservoir to said working chamber during withdrawal of successive portions of the rod upon the return stroke; resiliently yieldable valve means controlling the flow of liquid through certain of the partition passageways on said inward stroke and valve means controlling the flow of liquid through other of said partition passageways on the return stroke; all of the valves of the piston and at least those partition valves which control the flow of liquid from the working chamber to the reservoir being purely of the progressively acting type, not pre-loaded, and not subject to blow-off action, permanently open calibrated metering passages provided for by-passing the valving in both the piston and the partition, whereby for low piston velocities the resistance offered to the passage of damping liquid is by orifice control, but wherein said valves continually and progressively flex throughout the full operational range of higher velocities of the piston to afford resilient valve control of the piston movements throughout said range without reverting to orifice control, said passageways and valving for the piston comprising the following provisions: two series of passageways through said piston, one for the transmission of damping liquid from one side of the piston to the other upon the occurrence of an inward stroke and the other for transmission of liquid in the opposite direction upon the occurrence of an outward stroke, certain of the valving controlling the flow of damping liquid through the first series of passageways and adapted to yield to permit flow of liquid during the said working stroke, other valving controlling the flow of damping liquid through the said second series of passageways and adapted to yield to permit flow of liquid during the return stroke; said metering passages including first by-pass means affording a by-passing of said first named valving for a slight flow of liquid even though said first named valving is in closed position, and second by-pass means for affording a by-passing of said second named valving for a slight flow of liquid even though said second named valving is in closed position, the capacity of said second named by-pass means being approximately twice as great as the capacity of said first named by-passing means.

2. A hydraulic double-acting shock absorber comprising a cylinder enclosing a working chamber normally filled with damping liquid, a piston disposed for reciprocation within said working chamber, means for closing both ends of said cylinder, the means at one end of the cylinder comprising packing means, a piston rod connected to said piston and extending through said packing means; passageways extending through said piston for by-passing working liquid from one side of the piston to the other upon movement of the piston in either direction, and resiliently yieldable valves controlling the flow of liquid through said piston passageways; means comprised in the shock absorber serving as a damping liquid reservoir, a partition separating said working chamber from said reservoir, passageways extending through said partition for the respective passage of damping liquid from the working chamber into said reservoir upon displacement by increased penetration of the chamber by said piston rod upon the inward stroke of the piston, and return of liquid from the reservoir to said working chamber during withdrawal of successive portions of the rod upon the return stroke; resiliently yieldable valve means controlling the flow of liquid through certain of the partition passageways on said inward stroke and valve means controlling the flow of liquid through other of said partition passageways on the return stroke; all of the valves of the piston and at least those partition valves which control the flow of liquid from the working chamber to the reservoir being purely of the progressively acting type, not pre-loaded, and not subject to blow-off action, permanently open calibrated metering passages provided for by-passing the valving in both the piston and the partition, whereby for low piston velocities the resistance offered to the passage of damping liquid is by orifice control, but wherein said valves continually and progressively flex throughout the full operational range of higher velocities of the piston to afford resilient valve control of the piston movements throughout said range without reverting to orifice control, the passageways through the piston comprising two circular series of passageways having substantially circular outlet orifices through the respective faces of the piston, and the piston valving comprises resilient circular valve discs secured centrally to the respective faces of the piston and being of a diameter slightly short of the remote sides of the passageway orifices whereby thin substantially crescent-shaped openings are left in the orifices when the valve discs are closed, the series of passageways through the piston for transmitting liquid upon compression and the series for transmitting liquid upon rebound respectively comprising three groupings of passageways spaced 120° apart, one of the series having but one passageway in each group and the other series having at least two passageways in each group, the orifices of the passageways in the last mentioned group being located at different distances from the axis of the piston and the valve discs, and only the outer orifices having the crescent-shaped permanent openings, the inner ones being completely covered by the appropriate valve disc when the latter is in closed position.

3. As a sub-combination, a piston for use in a shock absorber of the class described which comprises a cylindrical body having two series of passageways therethrough, one for the transmission of damping liquid from one side of the piston to the other upon the occurrence of an inward stroke and the other for transmission of liquid in the opposite direction upon the occurrence of an outward stroke, one series of passageways consisting of three single passageways disposed 120° apart around an intermediate portion of the piston, and the other series of passageways consisting of three groups of twin passageways disposed 120° apart, the two series of passageways being in approximately circular alignment and each passageway having outlet orifices of substantially circular section at the respective surfaces of the piston, and disc valves secured axially to said piston faces and adapted to at least partially overlie and control said respective orifices, the single passageways of the first named series having larger inlet orifices than outlet orifices whereby the inlet orifices are only partially covered by the valve discs for controlling the other series, the twin passageways of the second named series having separate substantially circular outlet orifices but having intake orifices of enlarged cross section, said enlarged orifices being only partially covered by the valve disc for the first named series, the orifices of each pair of twin passageways being slightly offset radially whereby one orifice of each pair is fully covered by its controlling valve disc when in closed position but a crescent-shaped permanent opening it left in the outer orifice which is not completely covered by the disc in such closed position.

4. The shock absorber piston as set forth in claim 3 in which the orifices of said first named series also are not completely covered by their controlling valve discs whereby small crescent-shaped permanent openings are left in the orifices, the total of the cross-sectional areas of the permanent openings in the orifice controlled during the outward stroke of the piston being approximately twice that of the permanent openings in the orifices of the other series.

5. A double acting shock absorber of the telescoping piston-and-cylinder type, said shock absorber comprising a cylinder having a working chamber containing a damping liquid and closed at one end; and a piston disposed for reciprocation in the liquid within said working chamber and having an end of a piston rod secured thereto, said rod extending through a packed opening in the other end of said cylinder; a partition plate extending across said cylinder at a point spaced from said closed end for separating the working chamber from a reservoir chamber, controlled openings through said partition plate for the passage to the reservoir chamber of damping liquid displaced by increased penetration of the working chamber by said piston rod on its inward stroke, and for the return of such liquid during the return stroke of the piston, said openings arranged in two annular series around the partition plate, the openings of one series being radially offset with respect to the openings in the other series, a shallow annular groove in one surface of the plate intersecting all of the openings in one of said series, and a radially extending shallow cross groove in said one surface connecting said annular groove with one only of the openings in the other of said series.

6. A double acting shock absorber of the telescoping piston-and-cylinder type, said shock absorber comprising a cylinder having a working chamber containing a damping liquid and a piston disposed for reciprocation in said liquid within the working chamber and having one end of a piston rod secured thereto, said rod extending through a packed opening in one end of said cylinder; a partition plate in said cylinder separating the working chamber from an adjacent reservoir, two annular series of passageways through said partition plate, one series for the passage into the reservoir of damping liquid displaced from the working chamber by increased penetration of the working chamber by the piston rod on inward movement, and the other series for return of such liquid to the working chamber on outward movement, the latter annular series being of larger diameter than the former series, at least one valve applied to one face of said plate and controlling the outlet orifices of the first named series of passageways, a valve applied to the opposite face of the plate for controlling the outlet orifices of the passageways of the second named series, said last named valve comprising a flexible disc adapted to normally close the said last named outlet orifices but to flex to open said orifices under pressure of liquid flow, said disc also covering the intake orifices of the first named series of passageways, said intake orifices being of larger diameter than the outlet orifices whereby the outlet orifices rather than the inlet orifices constitute the ultimate control of flow through the passageways, holes formed in said disc in substantial registry with said last named intake orifices but of somewhat smaller diameter than the diameter of said intake orifices, but of larger diameter than the outlet orifices, all whereby any marginal burr that may be left in forming the holes will not interfere with the precise closing of the disc against the plate surface.

7. A double acting shock absorber of the telescoping piston-and-cylinder type, said shock absorber comprising a cylinder closed at one end and having a working chamber containing a damping liquid and a piston disposed for reciprocation in said liquid within the working chamber and having one end of a piston rod secured thereto, said rod extending through a packed opening in the other end of said cylinder; a partition plate in said cylinder separating the working chamber from an adjacent upper reservoir, an annular series of intake passageways passing through said plate for the flow to the reservoir chamber of damping liquid displaced by increased penetration of the working chamber by the piston rod upon inward movement, an an annular series of discharge passageways through said plate for the return flow of such liquid upon outward movement of said piston; at least one valve controlling the return flow through said last named passageway; said two series of passageways being offset radially from each other, the axes of the intake passageways of the first named series being disposed radially inward of those of the second or return passageways; an embossment formed centrally on the upper surface of the plate, outlet orifices of the first named series of passageways opening through the embossment but the intake orifices of the series of return passageways occurring in the unembossed peripheral surface area of the plate; said embossment being provided with a plurality of radially projecting promontories; disc valving secured axially to the partition plate, lying in contact with the surface of said embossment when in repose, and adapted to control flow of displaced damping liquid through the outlet orifices of the first named intake passageways; a baffle plate secured axially to the partition plate and spaced axially from the said disc valving and having a peripheral flange resting upon the said promontories outside of the disc valving, the baffle plate being of a diameter somewhat greater than that of the major portion of the embossment and less than the radial displacement of the outer edges of the intake orifices of the return passageways from the axis of the partition plate; all whereby displaced liquid from the outlets of the first series of passageways must flow over the edges of the major portion of the embossment and around the downturned flange of the baffle plate before entering the reservoir chamber, and returning liquid may readily flow into the intake orifices of the return passageways outwardly of the baffle plate.

8. The shock absorber as set forth in claim 7 in which there is disposed outwardly of said first named baffle plate a second baffle structure comprising a partition extending entirely across the cylinder and provided with an annular series of radially extending louvered slits for imparting a whirling action in one direction to displaced liquid which has already been diverted by the first baffle plate, and in the opposite direction to return flow of the liquid.

9. A double acting shock absorber of the telescoping piston-and-cylinder type, said shock absorber comprising a cylinder having a working chamber containing a damping liquid and a piston disposed for reciprocation in said liquid within the working chamber and having one end of a piston rod secured thereto, said rod extending through a packed opening in one end of said cylinder; a partition plate in said cylinder separating the working chamber from an adjacent reservoir; an annular series of passageways passing through said plate for the flow to the reservoir chamber of damping liquid displaced by increased penetration of the working chamber by the piston rod upon inward movement, and another annular series of passageways through said plate for the return flow of such liquid upon return movement of the piston; at least one valve controlling the return flow through said last named passageways; said two series of passageways being offset radially from each other, the axes of the first named passageways being radially inward of those of the return passageways; resilient disc valving lying upon the outward surface of said partition plate and adapted to flex outwardly to control the discharge of displaced liquid through the outlet orifices of the first named passageways in the outward surface of said plate; said first named passageways being symmetrically arranged in not more than three groups; a combined clamping washer and baffle plate secured axially to said partition plate and having a depressed central portion bearing on the central portion of the disc valving and serving to clamp said central valving portion against the corresponding portion of the partition plate, said baffle having an elevated annular portion outwardly of said central depressed clamping portion disposed over the outer flexing portions of the disc valving, and a peripheral lip flange at its rim around which displaced damping liquid must flow to reach the reservoir chamber; the diameter of the depressed clamping portion of the baffle plate being of such width relative to that of the disc valve that the general lines of flexure of the flexible portions of the disc valving will be approximately tangent to the periphery of said clamping portion and each will converge toward the next adjacent one but will not intersect therewith within the confines of the disc valving, whereby cylindrical flexing of the disc valving is assured.

10. A double acting shock absorber of the telescoping piston-and-cylinder type, said shock absorber comprising a cylinder closed at one end and having a working chamber containing a damping liquid and a piston disposed for reciprocation in said liquid within the working chamber and having one end of a piston rod secured thereto, said rod extending through a packed opening in the other end of said cylinder; a partition plate in said cylinder separating the working chamber from an adjacent upper reservoir, an annular series of intake passageways passing through said plate for the flow to the reservoir chamber of damping liquid displaced by increased penetration of the working chamber by the piston rod upon inward movement, and an annular series of discharge passageways through said plate for the return flow of such liquid upon outward movement of said piston; at least one valve controlling the return flow through said last named passageways; said two series of passageways being offset radially from each other, the axes of the intake passageways of the first named series being disposed radially inward of those of the second or return passageways; outlet orifices of the first named series of passageways opening through the surface of said plate upon the reservoir side thereof, disc valving secured axially to the partition plate, lying in contact with the reservoir surface of said plate when in repose, and adapted to control flow of displaced damping liquid through the outlet orifices of the first named intake passageways, the disc valving having a diameter sufficient for it to control said inward series of orifices but so that the periphery of said valving lies short of the point where the valving would exert any control of flow through the discharge passageways, an imperforate baffle plate secured axially to the partition plate and for the most part spaced axially from the disc valving on the reservoir side of said plate, said baffle plate having an uninterrupted circular peripheral flange directed toward the partition plate and having its annular margin disposed a slight distance radially outwardly of said outlet orifices of the intake passageways, but inwardly of the greater portion of the areas of the inlet orifices of the discharge passageways; all whereby displaced liquid from the outlets of the first or inlet series of passageways must flow around the downturned flange of the baffle plate before entering the reservoir chamber, but returning liquid may readily flow into the intake orifices of the return or discharge passageways outwardly of said baffle plate.

11. A double acting shock absorber of the telescoping piston-and-cylinder type, said shock absorber comprising a cylinder closed at one end and having a working chamber containing a damping liquid and a piston disposed for reciprocation in said liquid within the working chamber and having one end of a piston rod secured thereto, said rod extending through a packed opening in the other end of said cylinder; a partition plate in said cylinder separating the working chamber from an adjacent upper reservoir, an annular series of intake passageways passing through said plate for the flow to the reservoir chamber of damping liquid displaced by increased penetration of the working chamber by the piston rod upon inward movement, and an annular series of discharge passageways through said plate for the return flow of such liquid upon outward movement of said piston; at least one valve controlling the return flow through said last named passageways; said two series of passageways being offset radially from each other, the axes of the intake passageways of the first named series being disposed radially inward of those of the second or return passageways; outlet orifices of the first named series of passageways opening through the surface of said plate upon the reservoir side thereof, disc valving secured axially to the partition plate, lying in contact with the reservoir surface of said plate when in repose, and adapted to control flow of displaced damping liquid through the outlet orifices of the first named intake passageways, the disc valving having a diameter sufficient for it to control said inward series of orifices but so that the periphery of said valving lies short of the point where the valving would exert any control of flow through the discharge passageways, an imperforate baffle plate secured axially to the partition plate and for the most part spaced axially from the disc valving on the reservoir side of said plate, said baffle plate having an uninterrupted circular peripheral flange directed toward the partition plate and having its annular margin disposed a slight distance radially outwardly of said outlet orifices of the intake passageways, but inwardly of the greater portion of the areas of the inlet orifices of the discharge passageways; all whereby displaced liquid from the outlets of the first or inlet series of passageways must flow around the downturned flange of the baffle plate before entering the reservoir chamber, but returning liquid may readily flow into the intake orifices of the return or discharge passageways outwardly of said baffle plate, and a secondary baffle plate disposed outwardly of said primary baffle plate for further diverting said liquid without jetting to inhibit surface turbulence and consequent foaming, said secondary baffle plate having an annular series of substantially radially extending louvered slits therein for imparting opposite whirling actions to the liquid as it respectively enters and leaves the reservoir chamber.

References Cited in the file of this patent

UNITED STATES PATENTS

| | | |
|---|---|---|
| 2,719,612 | De Carbon | Oct. 4, 1955 |
| 2,757,762 | De Carbon | Aug. 7, 1956 |
| 2,792,914 | Benard | May 21, 1957 |
| 2,808,131 | Heckethorn | Oct. 1, 1957 |
| 2,811,226 | Allinquant | Oct. 29, 1957 |
| 2,818,141 | Tautz | Dec. 31, 1957 |
| 2,818,142 | Beaumont | Dec. 31, 1957 |
| 2,987,146 | Allinquant | June 6, 1961 |
| 3,003,594 | Carbon | Oct. 10, 1961 |